United States Patent

[11] 3,577,160

| [72] | Inventor | James E. White<br>7342 E. Thomas, Scottsdale, Ariz. 85257 |
|---|---|---|
| [21] | Appl. No. | 696,730 |
| [22] | Filed | Jan. 10, 1968 |
| [45] | Patented | May 4, 1971 |

[54] X-RAY GAUGING APPARATUS WITH X-RAY OPAQUE MARKERS IN THE X-RAY PATH TO INDICATE ALIGNMENT OF X-RAY TUBE, SUBJECT AND FILM
13 Claims, 19 Drawing Figs.

[52] U.S. Cl. ................................................. 250/59, 250/65, 250/92
[51] Int. Cl. ..................................................... G03b 41/16
[50] Field of Search............................................ 250/59, 91, 92, 65

[56] References Cited
UNITED STATES PATENTS

| 2,329,187 | 9/1943 | Lorimier et al. | 250/59 |
| 2,344,823 | 3/1944 | Landis et al. | 250/59 |
| 3,025,397 | 3/1962 | Travis et al. | 250/59 |
| 3,374,350 | 3/1968 | Mills, Jr. | 250/65 |
| 2,472,809 | 6/1949 | Decker | 350/10 |
| 3,281,598 | 10/1966 | Hollstein | 250/91 |

FOREIGN PATENTS

| 554,440 | 3/1923 | France | 250/59 |
| 933,605 | 9/1955 | Germany | 250/59 |

Primary Examiner—James W. Lawrence
Assistant Examiner—C. E. Church
Attorneys—Clarence A. O'Brien and Harvey B. Jacobson ABSTRACT: X-ray photographic apparatus through which reference data is photographically recorded on the film exposed to the X-rays together with the image of a subject being diagnosed. A locator for producing landmark images is also mounted on the subject, so that photographic records of the subject may be evaluated in light of both image distortion due to geometric misalignment and variation in the anatomy of the subject.

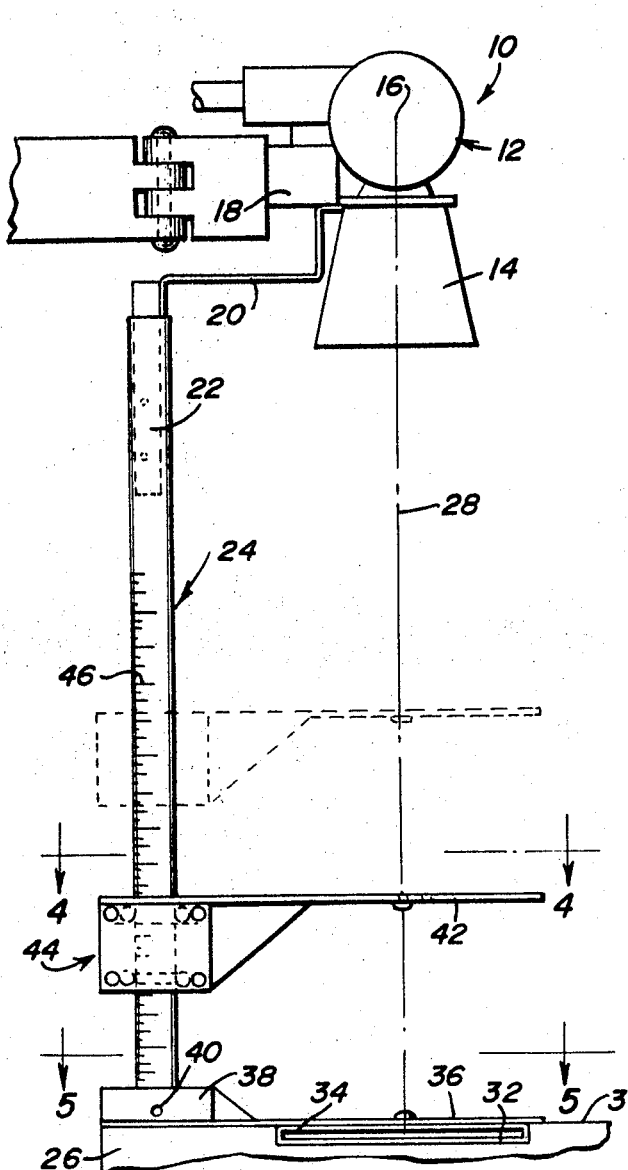

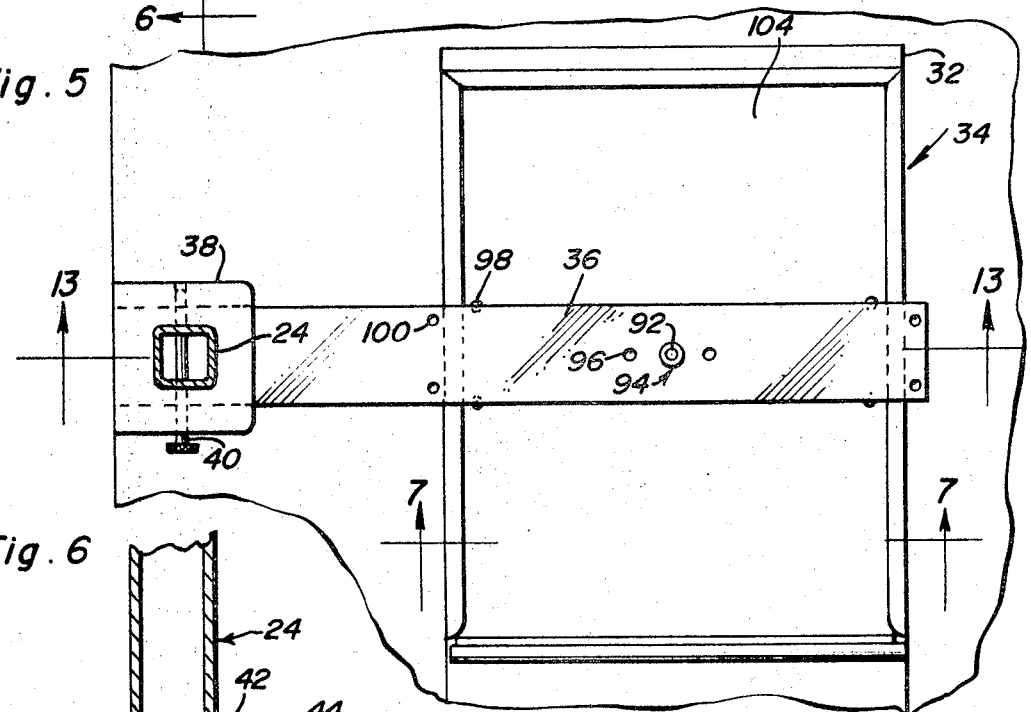
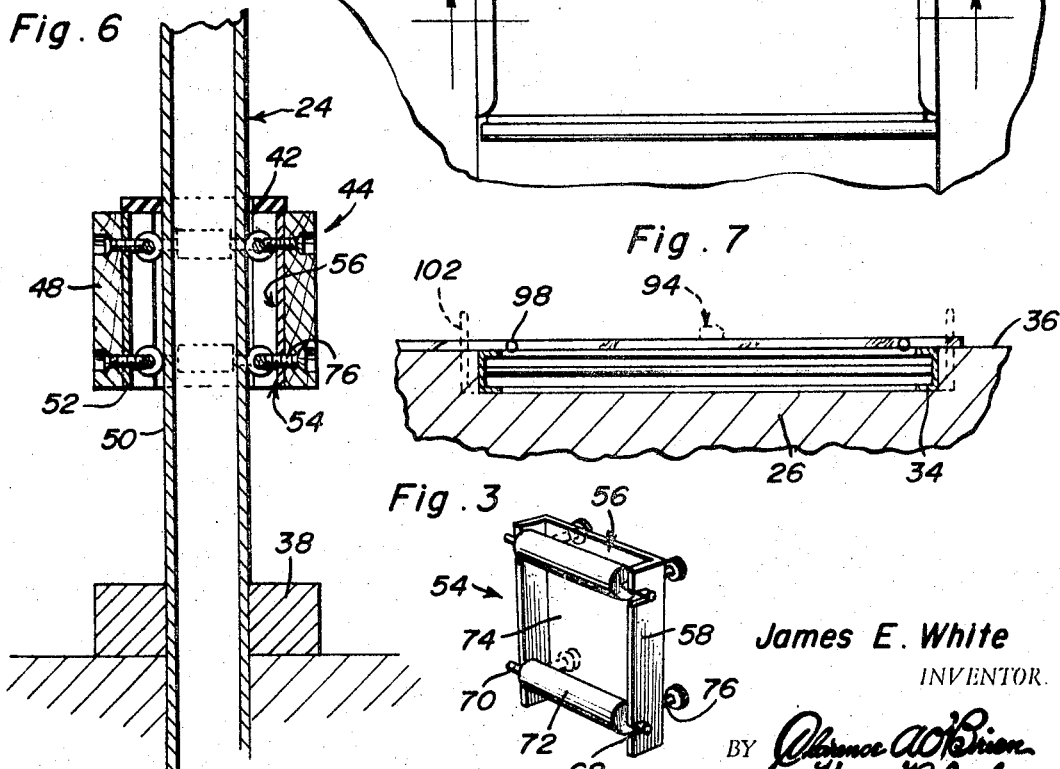
James E. White
INVENTOR

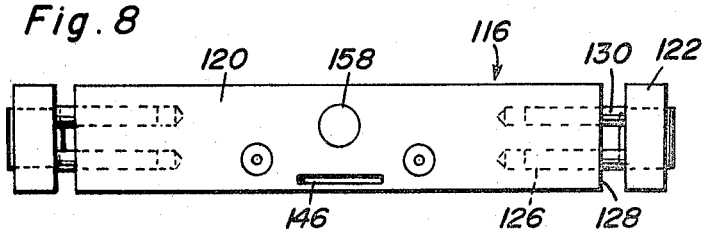
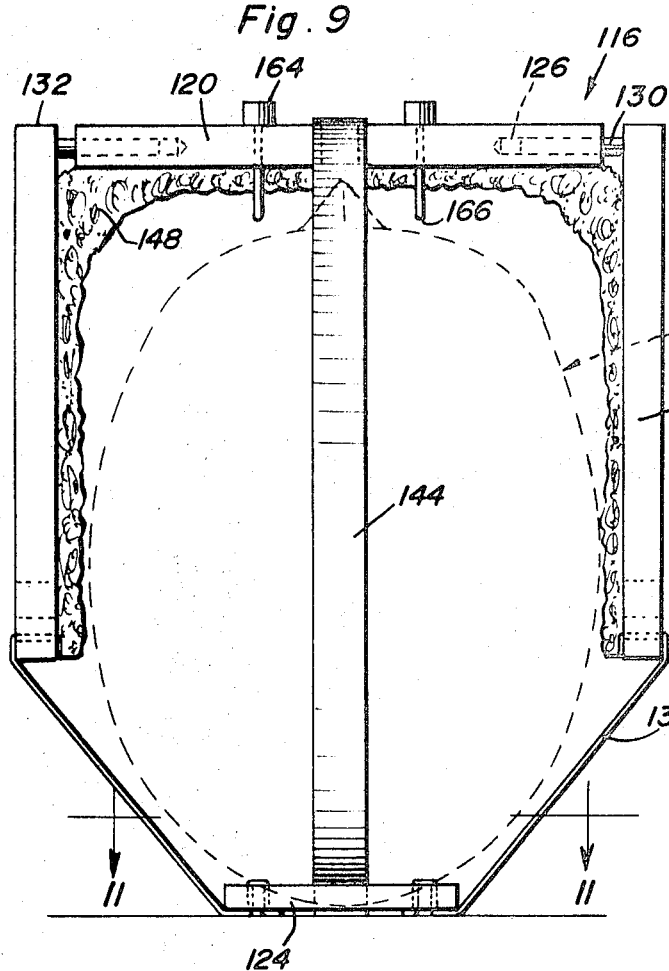
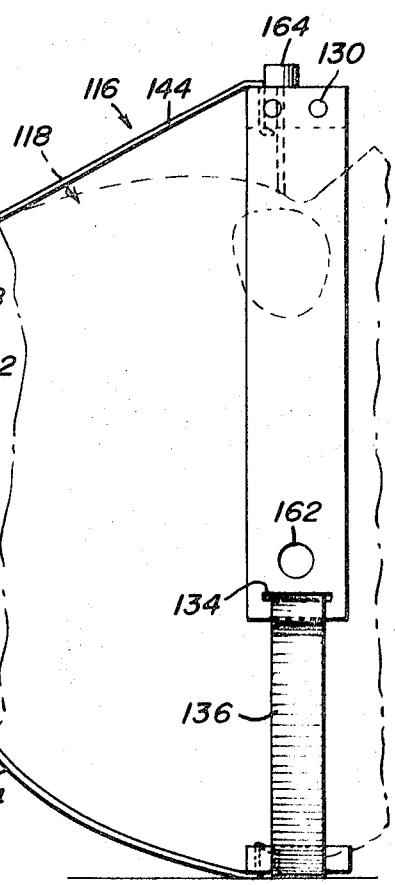
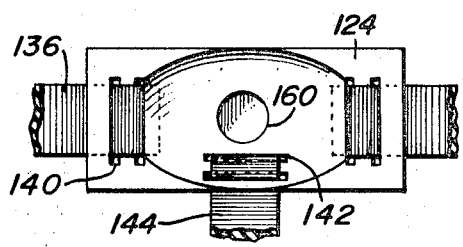
James E. White
INVENTOR

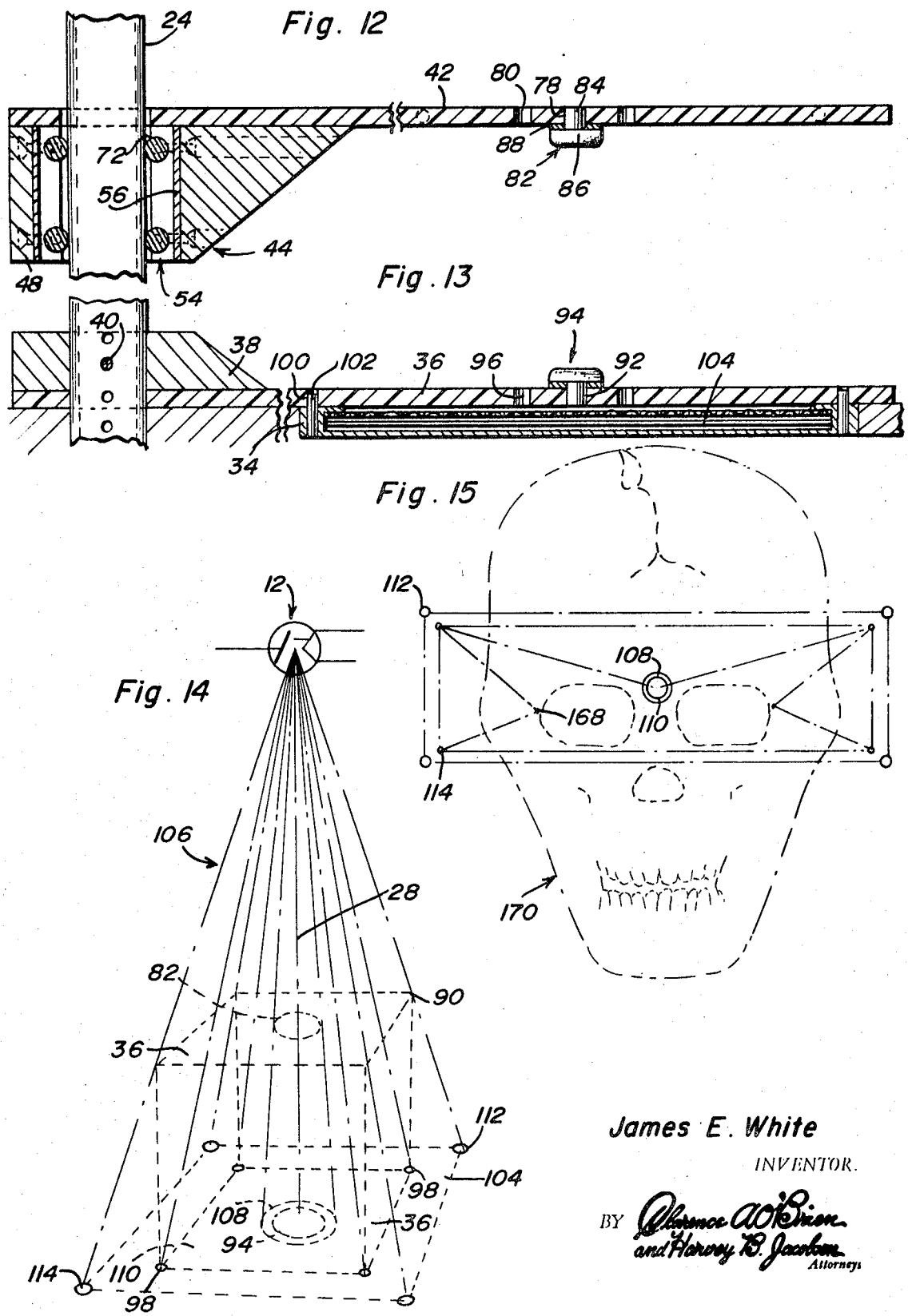

X-RAY GAUGING APPARATUS WITH X-RAY OPAQUE MARKERS IN THE X-RAY PATH TO INDICATE ALIGNMENT OF X-RAY TUBE, SUBJECT AND FILM

This invention relates to improvements in cephalometric roentgenography and more particularly to apparatus associated with X-ray machines by means of which recorded X-ray machines by means of which recorded X-ray images may be more accurately evaluated and analyzed.

A primary object of the present invention is to provide accessory facilities for X-ray machines through which geometrical data is recorded simultaneously with the recording of X-ray images on a recording medium or X-ray film. The geometrical data will be useful in gauging the position of the subject and the alignment or misalignment of the X-ray beam producing the image of the subject on the recording medium. A series of recorded X-ray images of a given subject may thereby be more accurately compared and evaluated.

An additional object of the present invention is to provide accessory apparatus for an X-ray machine through which both the alignment of the X-ray beam and peripheral distortion of the X-ray image may be gauged and measured by analytic geometrical methods from data recorded on the recording medium or X-ray film.

A further object of the present invention is to provide accessory equipment for X-ray machines producing data on the X-ray film at the same time that the subject is photographed from which a diagnostician may evaluate any bone movement of the subject as well as to detect any change in position of the subject relative to the X-ray machine or any misalignment of the parts of the X-ray machine. Thus, sufficient data is established by the apparatus of the present invention so that one may discriminate between errors introduced by the apparatus and reorientation of the subject or bone movements.

A still further object of the present invention is to provide accessory apparatus for X-ray machines so constructed as to obtain precision adjustments and subject orientation in connection with the recording of X-ray images bearing geometrical data from which the images may be evaluated.

In accordance with the foregoing object, additional objects of the present invention include facilities for accurately adjusting and positioning a variable plate member mounting image-producing elements and in cooperation therewith a subject locating device through which the subject may be accurately orientated in various positions and landmark images established in order to gauge any movement of bones.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of an X-ray machine including some of the accessory equipment of the present invention.

FIG. 2 is a front elevational view of the X-ray machine illustrated in FIG. 1.

FIG. 3 is a perspective view of a disassembled part of the accessory equipment.

FIG. 4 is a top sectional view taken substantially through a plane indicated by section line 4-4 in FIG. 1.

FIG. 5 is a top sectional view taken substantially through a plane indicated by section line 5-5 in FIG. 1.

FIG. 6 is an enlarged partial sectional view taken substantially through a plane indicated by section line 6-6 in FIG. 4.

FIG. 7 is a partial sectional view taken substantially through a plane indicated by section line 7-7 in FIG. 5.

FIG. 8 is a top plan view of a subject locating device associated with the X-ray machine of the present invention.

FIG. 9 is a side elevational view of the locator device shown in FIG. 8.

FIG. 10 is a partial front elevational view of the device shown in FIGS. 8 and 9.

FIG. 11 is an enlarged partial sectional view taken substantially through a plane indicated by section line 11-11 in FIG. 9.

FIG. 12 is an enlarged partial sectional view taken substantially through a plane indicated by section line 12-12 in FIG. 4.

FIG. 13 is an enlarged partial sectional view taken substantially through a plane indicated by section line 13-13 in FIG. 5.

FIG. 14 is a diagrammatic illustration showing the geometrical relationships associated with the accessory equipment of the present invention.

FIG. 15 is a typical X-ray image of a photographed subject together with the recorded geometrical data obtained by use of the accessory equipment of the present invention.

FIGS. 16, 16a, 16b and 16c, are diagrammatic illustrations of recorded X-ray data obtained in accordance with the present invention showing different situations which may be gauged or detected by such data. Referring now to the drawings in detail, FIGS. 1 and 2 illustrate a typical X-ray machine generally denoted by reference numeral 10 which includes an X-ray head 12 of a well-known construction having a downwardly extending conical member 14 through which a diverging X-ray beam emerges originating from some focal point 16 within the X-ray head. The X-ray head is mounted on a suitable support frame 18 and is connected by arm 20 and a tubing support 22 to a vertical post 24 which projects upwardly from a supporting table 26. The supporting frame 18 adjustably mounts the X-ray head 12 so that the optical axis 28 of the X-ray beam as shown in FIG. 1 will be disposed in parallel spaced relation to the vertical post 24 and be perpendicular to the top surface 30 of the table 26. A slot 32 may be formed in the table in order to receive a film mounting frame or cassette 34 within which an X-ray image-recording medium or film is carried adapted to be exposed to the X-ray beam emitted from the X-ray head and thereby record an image of a subject positioned on the table within the path of the X-ray beam.

As shown in FIGS. 1 and 2, a fixed plate member 36 is positioned on the table surface 30 above the X-ray film within the cassette 34, the plate member 36 being fixedly positioned by means of a mounting collar 38 secured to the bottom of the post 24 by a lockpin 40 for example. Vertically spaced in parallel relation to the fixed plate member 36, is an adjustable plate member 42 secured to guide assembly 44 through which the vertical post 24 extends. The plate member 42 is thereby adjustably positioned along the post 24 and maintained in accurate parallel relation to the fixed plate member 36 in order to accommodate subjects of different thicknesses which are positioned between the fixed plate member 36 and the adjustable plate member 42. One side of the post 24 may therefore be provided with measuring scale indicia 46 so that the thickness of the subject may be gauged by measuring the vertical spacing between the plate members 36 and 42.

Referring now to FIGS. 3 and 6 in particular, it will be observed that the guide assembly 44 includes a tubular collar 48 which is generally concentric with the tubular post 24. In the illustrated embodiment, the tubular post 24 and collar 48 are square in cross section including parallel spaced sides 50 and 52 externally of the post and internally of the collar 48 between which at least two opposed roller assemblies 54 are positioned. Each roller assembly as more clearly seen in FIG. 3, includes a channel element 56 having parallel spaced legs 58 provided with slots 60 receiving the axles 70 of a pair of parallel spaced rollers 72 positioned between the legs 58. Four apertures are formed in the web portion 74 of the channel element 56 through which screw members 76 extend into engagement with the axles 70 so that the rollers 72 may be held in engagement with the external side surfaces 50 of the post 24. The collar 48 is therefore provided with threaded bores aligned with the apertures in the web portions of the channel elements so as to threadedly receive the screw members 76. It will therefore be apparent, that the screw members 76 may be axially withdrawn by use of a tool such as a screwdriver in order to permit vertical adjustment of the plate member 42 secured to the top of the guide assembly. The screw members 76 may also be tightened against the axles 70 of the rollers so as to firmly hold the plate member 42 in its vertically adjusted position by a regulated frictional holding force.

Referring now to FIGS. 4 and 12, it will be observed that the plate member 42 supported by the guide assembly 44 extends from the vertical post 24 in perpendicular relation thereto and is made of a transparent material such as "Lucite" so that the X-ray beam will pass therethrough. An aperture 78 is formed in the plate member 42 at a location aligned with the optical axis 28 of the X-ray beam. A pair of locating apertures 80 are also formed in the plate member equidistant on either side of the aperture 78 along the longitudinal axis of the plate member 42. Mounted within the aperture 78, is an image-producing alignment element 82. As more clearly seen in FIG. 12, the alignment element includes a transparent body having a shank portion 84 received within the aperture 78 and a head portion 86 disposed on the underside of the plate member. The transparent body is thereby operative to concentrically position an annular disc element 88 relative to the aperture 78 between the head portion 86 and the underside of the plate member. The annular disc element 88 is made of a material impervious to X-rays so that it will form a ring image on the X-ray film. Also mounted by the plate member are four peripheral distortion elements or spheres 90. The distortion elements 90 are also made of material impervious to X-rays and may be embedded in the plate member 42 equidistant from the aperture 78 or the axis of the shank portion 84 to form the corners of a rectangular image pattern on the X-ray film having a geometric center within the image ring formed by the alignment element 82.

The fixed plate member 36 is identical in dimension and material to the adjustable plate member 42 and is vertically aligned below the plate member 42. An aperture 92 is also formed in the fixed plate member vertically aligned below the aperture 78 so that the optical axis 28 of an aligned X-ray beam will pass centrally therethrough. A central alignment element 94 is therefore also mounted in the aperture 92 identical in construction and dimension to the alignment element 82 associated with the adjustable plate member 42. The head portion of the alignment element 94 however projects above the fixed plate member 36 to hold the ring image producing disc element on the top surface of the fixed plate member. Also, locating apertures 96 are formed on either side of the central aperture 92 while four or more peripheral distortion elements 98 are embedded along the longitudinal edges of the fixed plate member equidistant from the aperture 92 and vertically aligned below the corresponding distortion elements 90 associated with the adjustable plate member 42. Unlike the adjustable plate member 42, the fixed plate member is provided with a plurality of apertures 100 adapted to receive aligning pins 102 as shown in FIGS. 7 and 13 in order to align the aperture 92 in the fixed plate member 36 with the geometric center of the X-ray film 104 carried in the cassette 34. Accordingly, the aligning pins 102 project upwardly from the cassette 34 for this purpose.

Referring now to the diagrammatic illustration in FIG. 14, it will be observed that when perfect alignment of the apparatus is obtained with the optical axis 28 of the divergent X-ray beam 106 centrally aligned with and perpendicular to the recording medium 104, the alignment element 82 positioned in the axially plane of plate member 42 parallel to the recording surface of the film 104 will produce a closed configuration image or ring 108 thereon, as distinguished from cross-hair images, which is concentric with the image ring 110 associated with the alignment element 94 positioned in the subject supporting plane of the fixed plate member 36. Similarly, the distortion elements 90 will produce corner images 112 on the recording surface somewhat larger than the corner images 114 associated with the distortion elements 98 of the fixed plate member 36 thereby forming rectangular patterns having a common geometric center coincident with the geometric center of the surface area enclosed by the concentric ring pattern formed by ring images 108 and 110.

It will be appreciated, that the subject being photographed by the X-ray beam must be positioned between the fixed plate member 36 and the adjustable plate member 42 in different viewing positions and in each viewing position must be centrally aligned with the central alignment elements 82 and 94. Toward this end, a subject locating device is associated with the X-ray machine and is generally denoted by reference numeral 116 in FIGS. 8 through 11. The locating device includes a plurality of viewing side members interconnected in enclosing relation to the subject such as the head 118 of a patient, the viewing side members including in the illustrated embodiment, a front view bar 120, a pair of side view bars 122 and a rear view, headrest bar 124. Each of the bars is made of a transparent material such as "Lucite" so that the X-rays may pass therethrough. The front view bar 120 is provided with two pairs of bores 126 at the opposite ends 128 thereof slidable receiving transparent connecting pins 130 which project from the side view bars 122 adjacent the upper ends 132 thereof as shown in FIG. 9. Formed adjacent the lower ends of the side view bars 122, are slots 134 to which the ends of elastic bands 136 are anchored in order to interconnect the side view bars 122 with the rear view headrest bar 124. Accordingly, a pair of connecting slots 140 are formed adjacent opposite ends of the rear view bar 124 as shown in FIG. 11 for anchoring of the elastic bands 136 thereto. A third pair of slots 142 are also formed in the rear view bar intermediate the two pairs of slots 140 so as to anchor one end of an elastic band 144 adapted to extend about the top of the patient's head, the other end of the elastic band 144 being anchored to the front view bar 120 by means of the slot 146 formed therein. It will therefore be apparent, that the bars 120, 122 and 124 may be readily assembled from an available supply of such bars of different dimensions so as to accommodate subjects of different sizes. When assembled and resiliently interconnected by the bands 136 and 144, the bar members will enclose the subject without any injury to the subject. As a psychological measure, the front view bar 120 and side view bars 122 may be lined with a cushioning material 148 as shown in FIG. 9.

The front view bar 120 is provided with an aperture 158 dimensioned so as to receive the head portion 86 of the alignment element 82 to thereby align the locator device and position the subject relative to the adjustable plate member 42. The rear view headrest bar 124 is therefore also provided with an aperture 160 in order to receive the head portion of the central aligning element 94 associated with the fixed plate member 36. In order to properly orientate the subject when obtaining a side view photograph, the side view bars 122 are provided with apertures 162 also dimensioned to receive the head portions of the central alignment elements 82 and 94. Further, the front view bar 120 is provided with a pair of apertures equidistant from the aperture 158 respectively receiving marker elements 164, the lower ends 166 of which as shown in FIGS. 9 and 10 contain material impervious to X-rays in order to establish landmark image points 168 on the X-ray film as shown for example in FIG. 15, when a front view X-ray photograph of the subject is obtained as indicated by the skull image 170.

With continued reference to FIG. 15, it will be apparent that the recorded X-ray image of the subject's skull is orientated relative to the image patterns established by the plate members 36 and 42 by means of the locating device which is also operative to establish the landmark image points 168 as aforementioned. When such perfect alignment is obtained, the image rings 108 and 110 will be concentric and form the center of a symmetrical pattern including the landmark points 168 and the rectangular patterns formed by the corner distortion images 112 and 114. This situation corresponds to the diagrammatic illustration shown in FIG. 16. The concentricity of the ring images 108 and 110 and the symmetry of the rectangular pattern therefore reflect proper alignment of the X-ray beam. Further, the corner images 112 establish an image distortion reference with respect to which image distortion may be measured. The corner images 114 on the other hand constitute distortion index points and also establish the plane of least magnification. Finally, the position of the landmark images 168 will indicate the amount of rotation of the subject. Referring therefore to FIG. 16a, it will be observed that when the image rings 108 or 110 are nonconcentric, nonalignment of the X-ray beam is indicated. On the other hand, when the corner images 112 and 114 are asymmetrically disposed with respect to the center of the X-ray film established by the concentric ring image pattern, misalignment of the apparatus is also indicated. By measuring the change in spacing of the corner images to the center as shown for example in FIG. 16b, the amount of peripheral distortion may also be gauged. Finally, a change in position of the landmark images 168 as shown in FIG. 16c, will indicate and permit measurement of rotation of the subject as recorded on the X-ray film.

From the foregoing description, it will be apparent that the concentric ring image pattern and symmetrical rectangular image pattern recorded on the X-ray film will not only be useful in detecting the various situations aforementioned, but will also permit the use of analytic geometrical methods for gauging the X-ray image so as to more accurately compare and analyze several X-ray films in order to make a proper medical diagnosis for example. In summary therefore, the accessory apparatus of the present invention including the fixed and adjustable plate members, the subject locating device and the facilities for centrally aligning the film mounting cassette with the fixed plate member represents a significant contribution to medical and dental science for diagnosis purposes in particular, the methods and principles of the invention being also applicable to X-ray photographs for other purposes such as industrial inspection methods. The arrangement of the present invention will therefore permit gauging of the amount of distortion of an object image on the X-ray film, and will indicate any misalignment of the X-ray optical axis. Also, the thickness of the subject being photographed may be recorded as well as rotation of the subject and a reference image for the plane of least magnification. Alignment of the subject as photographed on the X-ray film is also accomplished without any reliance on the position of soft tissue. In addition to the foregoing advantages, changes in the X-ray image of a subject due to movement of the subject bones may be detected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored resorted to, falling within the scope of the invention as claimed.

I claim:

1. In combination with a mounting frame having a vertical column and a horizontal base, an image receiving device having an image surface mounted adjacent the base upon which an image of a subject is adapted to be projected and a source of X-ray radiation projecting a divergent beam toward the base, apparatus for gauging the position of the beam and the image of the subject on said image surface, said apparatus comprising a pair of radiation transmissive plate members between which the subject is adapted to be positioned within the beam, means fixedly mounting one of the plate members between the source and the image receiving device for establishing a supporting plane adjacent the image receiving device on which the subject is adapted to rest, means movably mounting the other of the plate members on the column in adjustable parallel spaced relation to said supporting plane, and position gauging means opaque to said radiation mounted on said plate members aligned along an optical axis perpendicular to the image surface for establishing ring-like image patterns on the image surface.

2. The combination of claim 1 including locating means adapted to be mounted on the subject and engageable with said plate members for establishing landmark images on the image surface indicating subject orientation.

3. The combination of claim 2 wherein said position gauging means are centrally aligned with the image surface to project said ring like image patterns thereon that are concentric when the beam is aligned along said optical axis and peripheral alignment markers vertically aligned parallel to the optical axis producing a symmetrical image pattern with respect to said ring-like patterns.

4. The combination of claim 3 wherein each of said position gauging means includes a shank portion received within an aperture formed in the plate member, a head portion connected to the shank portion and an annular disc made of material impervious to said beam mounted on the shank portion between the head portion and the plate member.

5. The combination of claim 4 wherein said peripheral alignment markers on each plate member comprise corner spheres made of material impervious to said beam embedded in the plate member to define a rectangle having a geometric center located on the axis of the shank portion of the position gauging means.

6. The combination of claim 5 wherein said locating means comprises a plurality of side members through which said beam may pass, means interconnecting said side members in enclosing relation to the subject, each of said side members having aligning means receiving said head portions of the position gauging means for orientating the subject between the plate members, and marking means mounted on at least one of the side members for establishing said landmark images.

7. The combination of claim 1 wherein said position gauging means are centrally aligned with the image surface and project said closed configuration image patterns thereon that are concentric when the beam is aligned along said optical axis and peripheral alignment markers vertically aligned parallel to the optical axis producing a symmetrical image pattern with respect to the concentric ring-like image patterns when the beam is aligned along said optical axis, the peripheral alignment markers on the fixed plate member forming images representing points of least magnification on the image surface and said peripheral alignment markers on the adjustable plate member forming images representing distortion index points.

8. The combination of claim 7 including guide means mounted on the frame and connected to the adjustable plate member for adjustable positioning thereof parallel to the fixed plate member, and scale means mounted on the frame for measuring the spacing between the plate members.

9. The combination of claim 8 wherein said guide means comprises a slide collar secured to the plate member, at least two roller assemblies enclosed by the slide collar in engagement with the frame, each roller assembly including a channel element having aligned slots therein, at least two roller elements having axles received in said slots, and screw means threadedly mounted by the slide collar and engageable with said axles for holding the roller elements in engagement with the frame.

10. The combination of claim 7 wherein each of said position gauging means includes a shank portion received within an aperture formed in the plate member, a head portion connected to the shank portion and an annular disc made of material impervious to said beam mounted on the shank portion between the head portion and the plate member.

11. The combination of claim 10 wherein said peripheral alignment markers on each plate member comprise corner spheres made of material impervious to said beam embedded in the plate member to define a rectangle having a geometric center located on the axis of the shank portion of the position gauging means.

12. The combination of claim 1 wherein said position gauging means comprises X-ray opaque alignment markers in the form of circular rings positioned centrally on said plate members and additional X-ray opaque alignment markers located on the peripheries of said plate members.

13. The combination of claim 2 wherein said locating means comprises a plurality of side members through which said beam may pass, means interconnecting said side members in enclosing relation to the subject, each of said side members having aligning means receiving the position gauging means for orientating the subject between the plate members, and marking means mounted on at least one of the side members for establishing landmark images on the image surface indicating subject orientation relative to the position gauging means.